US008085430B2

(12) United States Patent
Takayama

(10) Patent No.: US 8,085,430 B2
(45) Date of Patent: Dec. 27, 2011

(54) PRINTER AND TAPE PRINTER

(75) Inventor: Shoji Takayama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 972 days.

(21) Appl. No.: 11/955,260

(22) Filed: Dec. 12, 2007

(65) Prior Publication Data

US 2008/0165370 A1 Jul. 10, 2008

(30) Foreign Application Priority Data

Jan. 5, 2007 (JP) ................................ 2007-000434

(51) Int. Cl.
*G06K 15/02* (2006.01)
*G06F 3/12* (2006.01)

(52) U.S. Cl. ........................ 358/1.2; 358/1.11; 358/1.15

(58) Field of Classification Search .................. 358/1.1, 358/1.2, 1.5, 1.6, 1.9, 2.1, 2.99, 3.1, 3.11, 358/3.12, 3.2, 3.21, 3.24, 3.27, 1.11, 1.12, 358/1.13, 1.15, 1.16, 1.17, 1.18, 523, 532, 358/538, 404, 444, 452, 453, 1.14, 500, 501, 358/528, 537, 400, 401, 451; 382/254, 258, 382/256, 286, 289, 290, 298, 299, 300, 301
See application file for complete search history.

(56) References Cited

U.S. PATENT DOCUMENTS

| | | | | |
|---|---|---|---|---|
| 6,731,407 | B1 * | 5/2004 | Hayama | 358/3.2 |
| 2001/0040684 | A1 * | 11/2001 | Takahashi | 358/1.2 |
| 2005/0012941 | A1 * | 1/2005 | Takahashi | 358/1.2 |

FOREIGN PATENT DOCUMENTS

| | | | |
|---|---|---|---|
| JP | 02266397 | A | 10/1990 |
| JP | 06-115224 | | 4/1994 |
| JP | 2002084419 | A | 3/2002 |
| JP | 2004-130675 | | 4/2004 |
| JP | 2004302806 | A | 10/2004 |
| JP | 2006227329 | A | 8/2006 |

* cited by examiner

*Primary Examiner* — Dov Popovici
(74) *Attorney, Agent, or Firm* — DLA Piper LLP (US)

(57) ABSTRACT

A printer includes: an area judging unit which judges whether a character printing area necessary for standard printing of an image corresponding to the character data on the printing material exceeds a definite length printing area; a printing data processing unit which creates corrected image data corresponding to a corrected printing image produced by thinning out the image corresponding the character data in the printing direction to perform compressive conversion process for fitting the character printing area to the definite length printing area when the area judging unit judges that the character printing area exceeds the definite length printing area; and a printing device which prints the corrected printing image on the printing material based on the corrected printing data created by the printing data processing unit.

12 Claims, 10 Drawing Sheets

PRINTER AND TAPE PRINTER

The entire disclosure of Japanese Patent Application No. 2007-000434, filed Jan. 5, 2007, is expressly incorporated by reference herein.

BACKGROUND

1. Technical Field

The present invention relates to a printer which performs various types of printing based on inputted data, and a tape printer which performs printing on a tape-shaped material by using this printer.

2. Related Art

A tape printer which displays an image of a portion of characters such as letters projecting from the printing width of tape before printing is known (see JP-A-6-115224). Also, a certain type of such tape printer has a print size controlling unit which reduces or reconstructs a character string for controlling print size when the string of characters such as letters cannot fit within the print width of tape (see JP-A-2004-130675).

However, when the character string after size reduction still cannot fit within the print width of the tape, there is a possibility that printing of the size corresponding to the designated tape length cannot be achieved. In addition, in case of reconstruction of the character string, processes required for the reconstruction may be complicated.

SUMMARY

Accordingly, it is an advantage of some aspect of the invention to provide a printer capable of efficiently controlling the size of contents of a data string or the like to be printed by a relatively easy method, and a tape printer including this printer.

A printer according to a first aspect of the invention includes: (a) a data memory unit which retains character data concerning a character to be printed on a printing material; (b) a mode setting unit which sets a definite length mode for specifying a definite length printing area where the character is printed on the printing material; (c) an area judging unit which judges whether a character printing area necessary for standard printing of an image corresponding to the character data on the printing material exceeds the definite length printing area; (d) a printing data processing unit which creates corrected image data corresponding to a corrected printing image produced by thinning out the image corresponding the character data in the printing direction to perform compressive conversion process for fitting the character printing area to the definite length printing area when the area judging unit judges that the character printing area exceeds the definite length printing area; and (e) a printing unit which prints the corrected printing image on the printing material based on the corrected printing data created by the printing data processing unit.

According to this printer, the area judging unit initially judges whether the character printing area necessary for standard printing of the image corresponding to the character data on the printing material exceeds the definite length printing area. Then, the printing data processing unit creates the corrected printing data corresponding to the corrected printing image by the relatively easy process for thinning out the image corresponding to the character data in the printing direction. In this case, the area of the corrected printing image produced based on the corrected printing data fits the definite length printing area. Thus, the area necessary for the contents of a data string or the like to be printed can be efficiently fitted within the definite length printing area desired by the user.

It is preferable that the printing data processing unit uniformly thins out the character data in the entire character printing area to perform the compressive conversion process. In this case, compression can be executed while maintaining the highest possible identifiability of the entire character. Moreover, since the character data is thinned out at equal intervals, standardized compression process controlled according to the necessary compression amount can be performed. Thus, the contents of a data string or the like can be processed relatively easily without excessive compression.

It is preferable that the mode setting unit sets a specific part mode which specifies a specific part of the character printing area to create the corrected printing data, and that the printing data processing unit thins out the character data corresponding to the specific part specified by the specific part mode to perform the compressive conversion process. In this case, the compressive conversion process can be performed only for the designated specific part. Thus, only the desired portion can be compressed according to the demand of the user, for example.

It is preferable that the data memory unit retains the character data as information in such a form as can be represented as bit map data. In this case, the compressive conversion process can be carried out on the basis of the dot numbers.

It is preferable that the printing data processing unit divides the character data into plural pieces of belt-shaped line data each of which has one-dot width in the compressive conversion process, and gives priority in thinning out to adjoining pieces of line data having identical continuous data to perform the compressive conversion process. In this case, data having low possibility of losing the meaning of the character has priority in thinning out. Thus, compression can be efficiently carried out while maintaining information on the respective character as a letter or the like.

A tape printer according to another aspect of the invention includes any one of the above printers. The printing unit performs printing on a tape-shaped material as the printing material.

According to this tape printer, it is judged whether the character printing area exceeds the definite length printing area. Also, the corrected printing data is created such that the corrected printing image can fit the definite length printing area by the relatively easy process for thinning out the image corresponding to the character data in the printing direction. Thus, the contents of the data string or the like to be printed can be efficiently fitted to the length of the tape-shaped material by the relatively easy method.

It is preferable that the printing data processing unit performs compressive conversion process in the longitudinal direction of the tape-shaped material. In this case, effective compression can be carried out in the definite length mode printing where the definite length printing area is specified.

BRIEF DESCRIPTION OF THE DRAWINGS

The invention will be described with reference to the accompanying drawings, wherein like reference numbers refer to like elements.

DESCRIPTION OF EXEMPLARY EMBODIMENTS

First Embodiment

Figure 1:
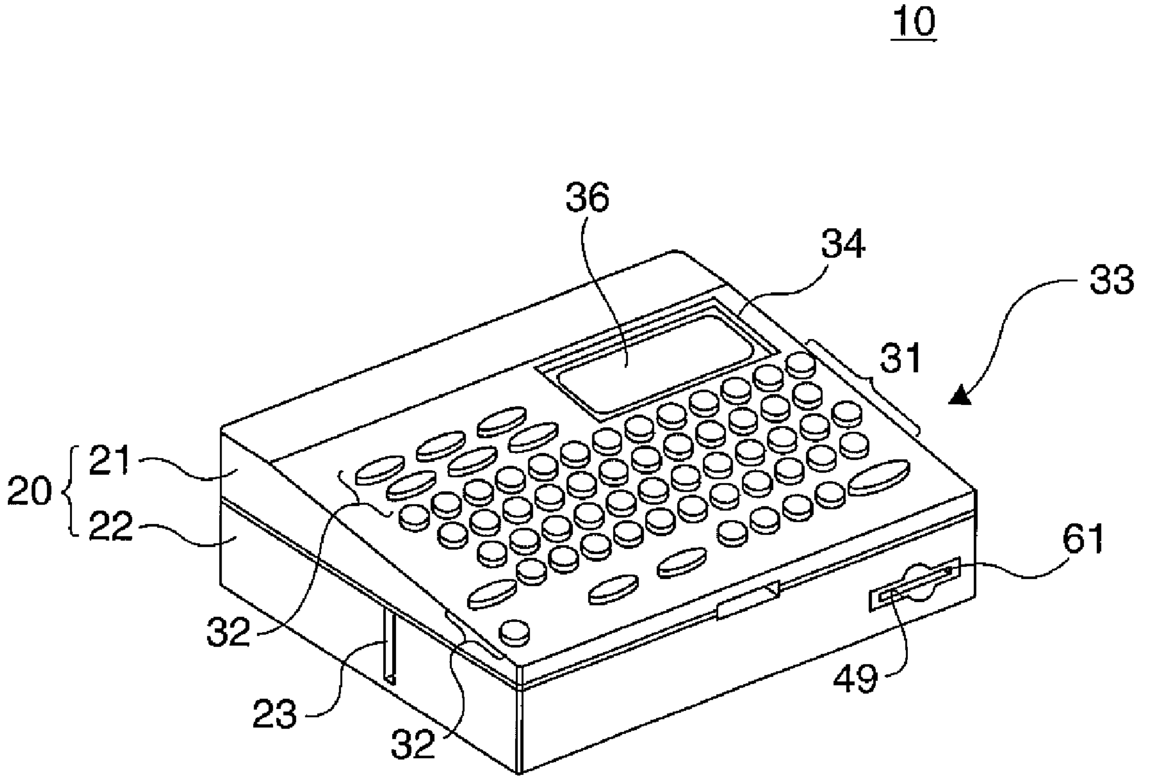
FIG. 1 is a perspective view illustrating an external appearance of a tape printer according to a first embodiment.
Figure 2A:
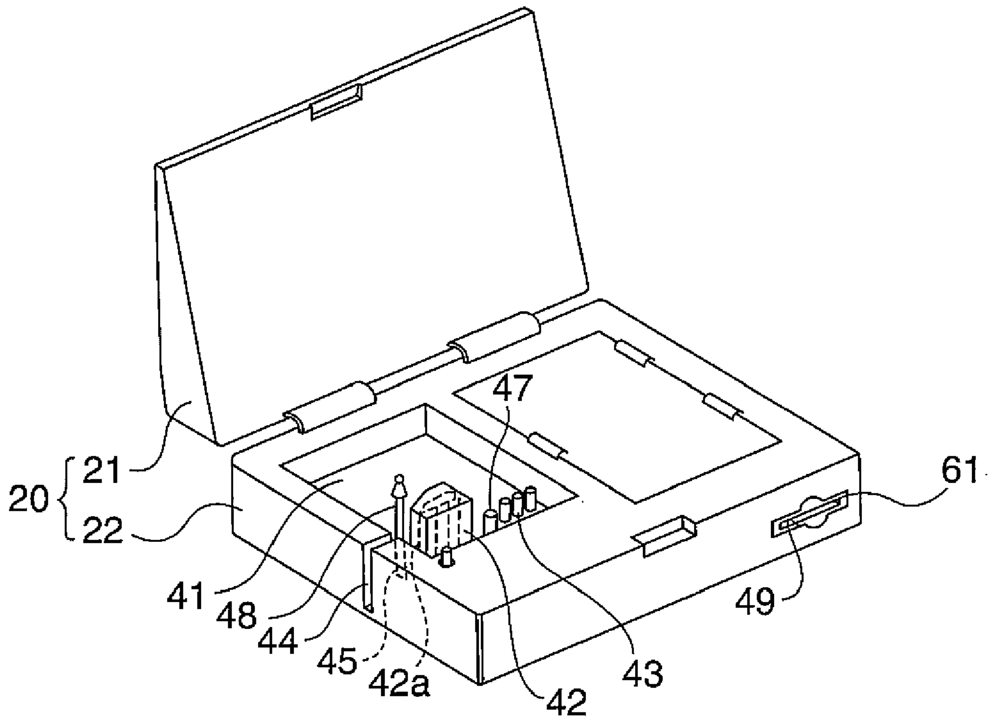
FIG. 2A is a perspective view illustrating an external appearance of the tape printer shown in FIG. 1 in a cover open condition.
Figure 2B:
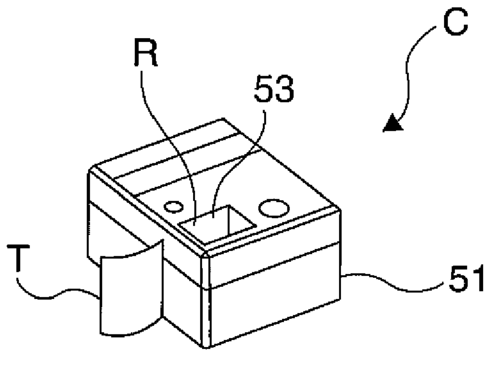
FIG. 2B is a perspective view illustrating an external appearance of a tape cartridge attached to the tape printer.

FIG. 1 is a perspective view of the entire appearance of a tape printer as a printer according to this embodiment. FIG. 2A is a perspective view of the tape printer shown in FIG. 1 in the condition where an open/close cover is opened. FIG. 2B is a perspective view showing a tape cartridge attached to the tape printer.

As shown in FIGS. 1 and 2A and 2B, the outside contour of the tape printer 10 is formed by a printer case 20 divided into upper and lower parts. The case 20 has an upper case 21 as the open/close cover and a lower case 22 containing mechanical units such as a pocket 41 to which a tape cartridge C is attached.

A keyboard 33 is disposed on the front area of the upper surface of the upper case 21, and a display 34 is on the right part of the central area thereof. The upper cover 21 is opened during use of the tape printer 10 except for the time of detachable of the tape cartridge C.

The key board 33 is a component through which information such as data and command is inputted to a microcomputer chip or the like as a control system contained in the lower case 22. The keyboard 33 has character keys 31 for inputting text information including letters, symbols, numerals and others, function keys 32 for specifying various operation modes and the like, and other parts arranged on the board. The function keys 32 include not-shown [power] key, [print] key for commanding printing operation, [selection] key for data determination and line feed at the time of input of text information and for selection command of various modes on a selection screen, [cursor] keys for shifting cursor in directions of up ("↑"), down ("↓"), left ("←"), and right ("→") and in the display range of a display screen 36, [external font] key for creating letters, symbols and the like not stored in the printer beforehand as "external fonts", and other keys. In the following description, letters, symbols, numerals and the like discussed above, and "external fonts" (such as pictorial characters) and others are collectively referred to as "characters".

The various modes to be set on the selection screen discussed above include a definite length mode which specifies a definite length print range for character printing on a print material, for example. The user specifies a desired mode from the various modes including the definite length mode by operating the functions keys 32. Details of this operation will be described later.

The display 34 has the display screen 36 capable of displaying n rows×m lines (n and m are appropriate natural numbers) of arbitrary characters in horizontal and vertical directions, and displays processing results, commands and the like of the microcomputer chip or other device as the control system contained in the lower case 22. More specifically, the display 34 is used at the time of selection of a character string as a target to be processed, input of data, various commands and instructions and the like by the user through the keyboard 33 for editing the character string, visual recognition of the results and the like, and for other purposes.

The lower case 22 has the pocket 41 to which the tape cartridge C is attached. The tape cartridge C is detachable from the pocket 41 with the upper case (open/close cover) 21 opened. The tape cartridge C accommodates a tape T and an ink ribbon R having constant width, and a through hole 53 into which a head unit 42 provided on the pocket 41 is inserted. A tape identifying sensor 43 constituted by a micro switch or the like is provided on the pocket 41 to identify the type of the tape T whose width differs according to types. Thus, the tape identifying sensor 43 detects the type and setting information of the tape T.

The tape T corresponds to the tape-shaped material as a printing material. The tape T has an adhesive surface on its back, which is covered by a released paper. The tape T and the ink ribbon R travel while overlapping with each other at the position of the through hole 53. Then, only the tape T is discharged to the outside, and the ink ribbon R is wound inside the printer.

The head unit 42 provided at an appropriate position of the pocket 41 contains a printing head 42*a* constituted by a thermal head. The printing head 42*a* contacts the back surface of the ink ribbon R exposed through the through hole 53 of the tape cartridge C under attachment of the tape cartridge C to the pocket 41. Then, desired characters such as letters are printed on the surface of the tape T by heat release operation of the printing head 42*a*.

A tape ejecting slot 44 for connecting the pocket 41 and the outside of the printer is formed on the left part of the lower-case 22. A tape cutter 45 for cutting the discharged tape T is disposed in such a position as to face the tape ejecting slot 44. The pocket 41 has driving shafts 47 and 48 and others engaging with a driven section of the attached tape cartridge C. During printing, the tape T and the ink ribbon R contained in the tape cartridge C are fed by the driving shafts 47 and 48 using a built-in feed motor (not shown) as driving source, and the printing head 42*a* is driven in synchronization with the feeding by the driving shafts 47 and 48. After completion of printing, the tape T is continuously fed until the cut position set for the tape T reaches the position of the tape cutter 45.

A slot 49 through which a card-shaped portable memory device 61 is inserted is formed on the front part of the lower case 22. When the portable memory device 61 is inserted through the slot 49 and pushed into a narrow space of the slot 49 by using a certain force, the portable memory device 61 is brought into connection with the microcomputer chip or the like as the control system contained in the lower case 22 via a built-in connector (not shown). The portable memory device 61 to be attached to the slot 49 is freely attachable and detachable, and can be separated from the connector and pulled out of the slot 49 by pulling the end of the portable memory device 61 exposed through the opening of the slot 49 by a certain force.

The portable memory device 61 inserted through the slot 49 is a general purpose memory card capable of retaining data compatible with a plurality of devices, and is constituted by a SD card, a memory stick or the like. Printing data and printing programs are recorded on the portable memory device 61 in a general purpose format. The printing data include information such as characters to be displayed on the display 34 of the tape printer 10 or to be printed on the tape T by the head unit 42. The printing programs include procedures for printing on the tape T by the head unit 42 or other components of the tape printer 10, printing data, and others. The tape printer 10 contains data concerning characters and control/processing mechanisms for the data (details of which will be described later with reference to FIG. 3), and thus can perform tape printing independently. It is possible, however, to insert the portable memory device 61 into the printer 10 as discussed above and perform tape printing of characters not stored in the printer such as external fonts based on outside data.

The general using method of the tape printer 10 thus constructed is as follows. After attaching the tape cartridge C to the pocket 41, the user inputs printing information such as desired letters and symbols through the keyboard 33 and command printing while checking the input/editing results on the display 34. In response to this command, the tape T is fed out of the tape cartridge C, and desired printing is performed on the tape T by the printing head 42*a*. Then, the printed section is appropriately discharged through the tape ejecting slot 44 to the outside. After completion of printing, the tape T is continuously fed until the tape T reaches the end of the tape length including the blank area. At this position, the tape T is cut and a label is thus produced.

Figure 3:
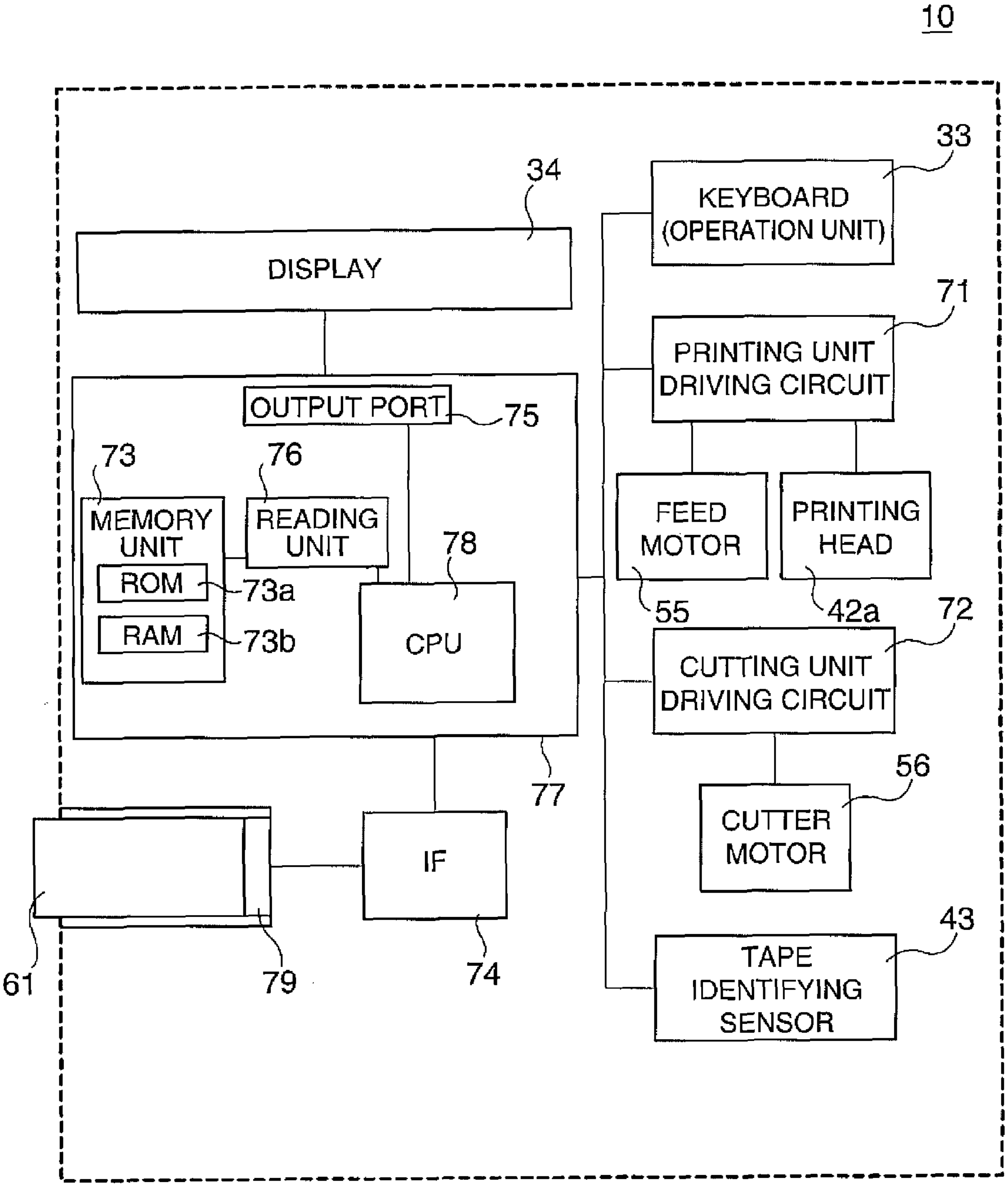
FIG. 3 is a block diagram showing a control system of the tape printer shown in FIG. 1.

The structure of the control system of the tape printer 10 shown in FIG. 1 and other figures is now explained with reference to FIG. 3. The tape printer 10 includes a printing unit driving circuit 71 for driving the printing head 42*a* and a feed motor 55, a cutting unit driving circuit 72 for driving a cutter motor 56 for executing cutting operation by using the tape cutter 45, an interface unit 74 for transmitting and receiving data to and from the portable memory device 61, and a control processing unit 77 for appropriately operating these circuit sections while controlling them, as well as the key board 33 and the display 34 for interfacing with the user and the tape identifying sensor 43 for detecting the type of the tape. Thus, the printing head 42*a* and the printing unit driving circuit 71 function as a printing device which performs printing on the tape T, and the tape cutter 45, the cutter motor 56, and the cutting unit driving circuit 72 function as a cutter mechanism for cutting the tape T.

The control processing unit 77 is a control unit constituted by an IC such as a microcomputer chip. The control processing unit 77 has a memory unit 73 as a data memory unit for storing data, calculation results and the like, a reading unit 76 for reading various data accumulated in the memory unit 73, a character processing unit for processing character data based on the data read from the reading unit 76, an output port 75 for transmitting output data to the display 34, and a CPU 78 for performing calculations required for character printing.

The memory unit 73 is constituted by a ROM 73*a* and a RAM 73*b*. The ROM 73*a* has a control program area for storing a control program under which the control processing unit 77 executes processing, a control data area for storing control data including character modification table and the like, and a CG data area for storing font data of the characters prepared for the tape printer 10. The RAM 73*b* receives power supply from a not-shown backup circuit so that the stored data can be retained after power failure. The RAM 73*b* has various registers, and various memory areas such as a text data area for storing text data such as characters inputted by the user through the keyboard 33, a format data area for storing formats used when the text data is printed, an external data introduction area for temporarily retaining printing data and printing programs read from the portable memory device 61, and a buffer area, which are used as operation areas for control processing. In this embodiment, data concerning the characters stored in the memory unit 73 (hereinafter abbreviated as character data) and the like are all information in such a form as can be represented as bit map data. Thus, a compressive conversion process carried out in the printing process can be performed on the basis of dot numbers, for example.

The control processing unit 77 operates under the control program contained in the ROM 73*a* of the memory unit 73. The control processing unit 77 receives inputs such as various commands, various data, various detection signals from the keyboard 33 or other components, processes the various data and the like retained in the RAM 73*b* of the memory unit 73, and outputs control signals to the display 34, the printing unit driving circuit 71, the cutting unit driving circuit 72 and others to display necessary information on the display screen 36. Also, the control processing unit 77 controls the printing head 42*a* such that printing can be performed on the tape T under predetermined printing conditions, and executes other processes. Thus, the control processing unit 77 controls the overall sections of the tape printer 10. In these operations, the characteristic operation according to this embodiment is a compressive conversion process to thin out and correct data concerning a character string constituted by characters to be printed so that a character printing area as an area occupied by the character string can be fitted within a predetermined tape length. During the compressive conversion process, the CPU 78 reads various data retained in the RAM 73*b*, and performs calculations based on these data.

Figure 4:
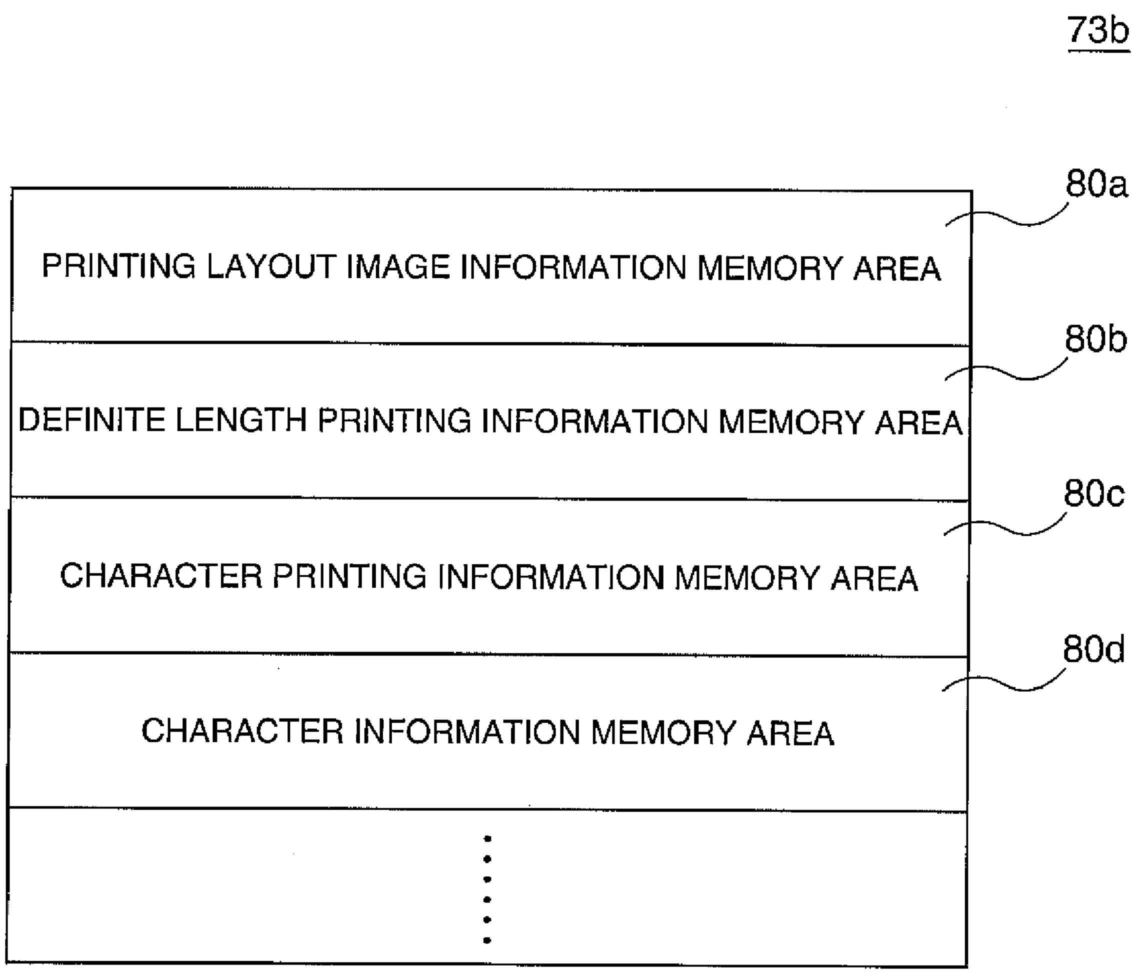
FIG. 4 is a view for explaining a data memory unit.

As described above, various data required for the printing process are stored in the various memory areas such as the text data area in the RAM 73*b*. However, a series of memory areas shown in FIG. 4 are left in the RAM 73*b* so as to secure areas for storing data which is characteristic information according to this embodiment. More specifically, as one of the respective memory areas of the RAM 73*b*, a printing layout image information memory area 80*a* (including text data area) stores information on data concerning the character string to be printed, where the character data concerning the respective characters converted by the compressive conversion process. A definite length printing information memory area 80*b* stores information on a definite length printing area as a predetermined printing area on the tape T. A character printing information memory area 80*c* stores information on a character printing area. A character information memory area 80*d* stores character data on the respective characters prior to the compressive conversion process.

The operation of the printing process performed by the control processing unit 77 is now described with reference to the flowchart shown in FIG. 5. The control processing unit 77 acquires a printing image constituted by a character string inputted by the user (step S1). More specifically, the control processing unit 77 retains character data concerning the character string to be printed in the character information memory area 80*d* of the RAM 73*b*. This character data is also retained in the printing layout image information memory area 80*a* as the initial printing image data.

Then, the control processing unit 77 judges whether a definite length mode has been set (step S2). The definite length mode herein refers to a mode which specifies a definite length printing area (hereinafter abbreviated as "definite length") in advance as a predetermined printing area where printing is practically performed on the tape T. More specifically, the user operates the function keys 32 or the like as the mode setting unit to determine whether the definite length mode is to be set or not and specify the definite length when the definite length mode is selected. Then, the control processing unit 77 as the mode setting unit receives the setting of the definite length mode. The setting of the definite length mode is thus completed by these steps. The information on the definite length mode thus established (including information about whether the setting has been established or not) is retained in the definite length printing information memory area 80*b* shown in FIG. 4, and the judgment in step S2 is made by reading this information from the definite length printing information memory area 80*b* of the RAM 73*b*.

When it is judged that the definite length mode has not been established in step S2, the input operation by the user is completed. When the user further gives an operation command for printing by operating the function keys 32 or the like shown in FIG. 1, the printing process for printing on the tape T having a length corresponding to the character data is performed without processing the character data concerning the character string or other processing (step S3).

When it is determined that the definite mode has been established in step S2, the CPU 78 compares the definite length with the printing length corresponding to the length of the character string to be printed (step S4).

Figure 6:
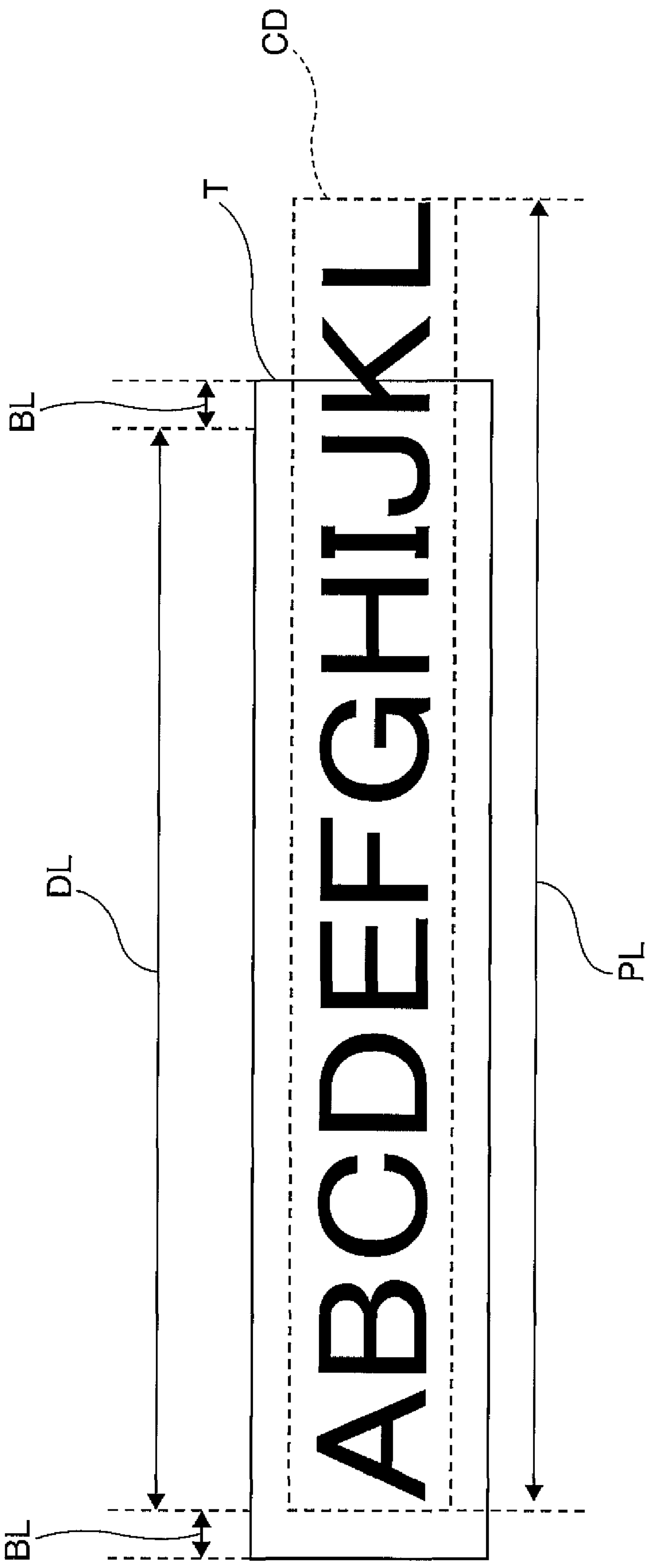
FIG. 6 is a schematic view for illustrating an example of a printing length.

FIG. 6 schematically illustrates a virtual example of the printing length of the character string to be printed and the definite length under the condition of the definite mode having been set. According to the example in FIG. 6, a definite length DL as a part of the entire length of the tape T in the longitudinal direction corresponds to the remaining length after removal of blank lengths BL necessary as left and right margins. In the example of FIG. 6, the DL is 50 mm. The printing length PL corresponds to the length of the tape T in a character printing area CD necessary for standard printing of the image corresponding to the character data of the character string constituted by letters "A through L" in the FIG. 6. In the example in FIG. 6, the printing length PL is 60 mm. In this case, the compressive conversion process for reducing the printing length PL to ⅚ or shorter needs to be performed for the character data so as to decrease the printing length PL of the character printing area CD and fit the printing within the definite length DL. The information on the character printing area CD is retained as necessary in the character printing information memory area 80*c* shown in FIG. 4 according to the character input operation by the user.

The comparison made in step S4 is a comparison between information about the definite length DL and the information about the printing length PL shown in FIG. 6, for example, performed in the CPU 78. That is, the CPU 78 as the area judging unit judges whether the printing length PL corresponding to the character printing area exceeds the definite length DL. More specifically, the information on the definite length DL retained in the definite length printing information memory area 80*b* shown in FIG. 4 is initially read out at the time of setting of the definite mode. Simultaneously, the information on the printing length PL is read from the information concerning the character printing area CD stored in the character printing information memory area 80*c* shown in FIG. 4. Then, the CPU 78 performs predetermined calculation based on the information on the definite length DL and the printing length PL thus read out under the control program for comparing the definite length DL with the printing length PL to compare both the lengths DL and PL. Thus, judgment whether the printing length PL exceeds the definite length DL is made by these steps.

When it is determined that the printing length PL does not exceed the definite length DL in step S4 as a case different from the case in FIG. 6, the compressive conversion process is not performed and the input operation by the user is completed. When the user further gives an operation command for printing by operating the function keys 32 or the like shown in FIG. 1, the ordinary definite length printing process is executed (step S5).

When it is judged that the printing length PL is equivalent to the definite length DL or longer in step S4, the control processing unit 77 displays this state on the display screen 36 shown in FIG. 1. Then, the control processing unit 77 judges whether the character data compression is to be performed or not in response to a selection command given by the user through the function keys 32 or the like (step S6).

When it is determined that the character data compression is not selected in step S6, the control processing unit 77 performs a definite length over process (step S7). More specifically, the control processing unit 77 cancels the definite length mode and performs ordinary printing according to the command by the user, for example.

When it is judged that the character data compression is selected in step S6, the CPU 78 calculates conversion of a compression amount necessary for fitting the printing length PL to the definite length DL (step S8). Then, an appropriate method for the compressive conversion process is selected according to the calculated compression amount (step S9). According to the compressive conversion process in this example, an image corresponding to the character data is thinned out in the printing direction to form a corrected printing image. Thus, the compressive conversion process in this example creates corrected printing data corresponding to the corrected printing image such that the printing length PL of the character printing area CD shown in FIG. 6 can be fitted within the definite length DL. In this example, thinning out is carried out at equal intervals in the printing direction to form the corrected printing image. In this case, the method of the compressive conversion process in step S9 is uniformly determined based on the compression amount calculated in step S8. This process will be described later in detail.

After the compressive conversion process is determined in step S9, the control processing unit 77 judges whether compression of the character data by this compressive conversion process is to be executed or not in response to the selection command given by the user by through the function keys 32 or the like (step S10). In this step, it is possible to supply visual information by displaying the printing image based on the corrected character data on the display screen 36 shown in FIG. 1 so that the user can determine whether printing according to the corrected image is to be executed or not.

When it is judged that the character data compression is not selected in step S10, the control processing unit 77 carries out the definite length over process in response to the command of the user (step S7).

When it is judged that the character data compression is selected in step S10, the control processing unit 77 as the printing data processing unit performs compressive conversion of the character data according to the selected compressive conversion process to carry out printing of the character string corresponding to the character data obtained after compressive conversion (step S1).

In the printing process in step S11, the printing head 42*a* and the like as the printing device print the corrected printing image on the tape T based on the printing data corrected by the control processing unit 77.

Figure 7:
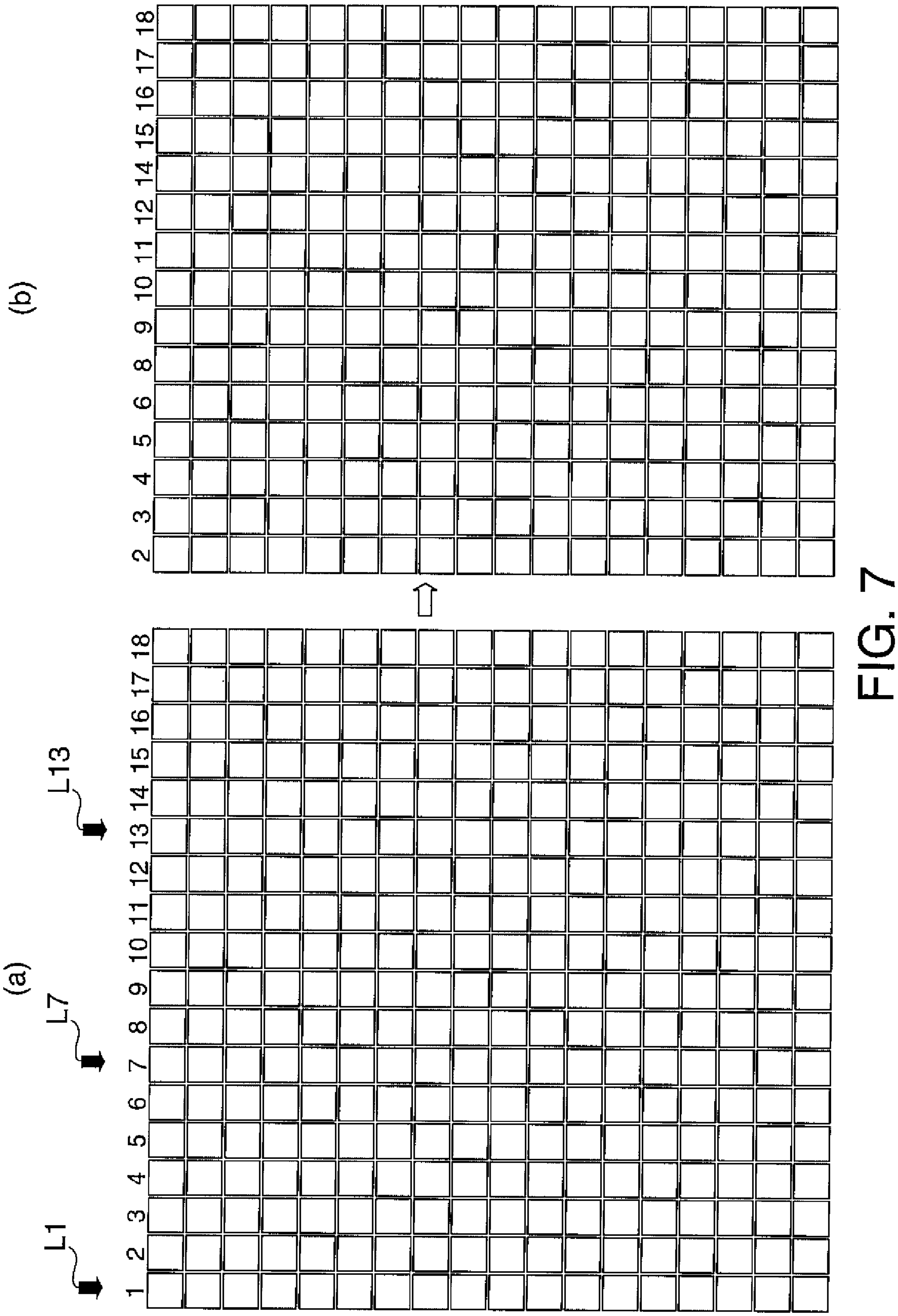
FIGS. 7A and 7B are views for explaining a compressive conversion process.

FIGS. 7A and 7B are views for explaining an example of the compressive conversion of the character data. The character data according to this embodiment is information in such a form as can be represented as bit map data, and the compressive conversion process can be performed on the basis of the number of dots. Thus, in the example shown in FIGS. 7A and 7B, dots corresponding to the bit map data are removed at a constant rate for compression of the character data.

FIG. 7A shows respective dots corresponding to the character data represented by bit map data prior to the compressive conversion process. In this example, the vertical direction in the figure corresponds to the direction perpendicular to the printing direction. In this compressive conversion process, the character data is divided into belt-shaped plural pieces of line data each of which has one-dot width, and data is thinned out and corrected on the basis of these divisions. In dividing the line data, a serial number is horizontally given to each dot of vertical lines as shown in the figure, and each vertical line having the corresponding number is handled as one line data.

In this compressive conversion process, the corrected printing data is created by thinning out the character data at equal intervals by the unit of line data discussed above. More specifically, in case of the example shown in FIG. 6, the character data needs to be reduced to ⅚ or smaller in the printing direction as explained above. In this case, one line data is removed for every six lines. Thus, first line data L1, seventh line data L7, and thirteenth line data L13 indicated by arrows in FIG. 7A are removed from the respective line data, for example. Though not shown in the figure, one line data is removed for every six lines similarly in the following area. Since one line data is removed for every six lines, the printing length PL of the character printing area CD can be compressed to ⅚ or smaller in the printing direction, and thus can be fitted to the definite length DL in FIG. 6.

Thus, the corrected printing data from which the first line data L1 and other data are removed to correspond to the corrected printing image is created by the above processes as shown in FIG. 7B. Consequently, the image corresponding to the character data can be thinned out in the printing direction, and thus the corrected printing image can be formed. The corrected printing data thus created is retained in the printing layout image information memory area 80*a* shown in FIG. 4 as data corresponding to the corrected printing image. At the time of the printing process, this information as the corrected printing image is read from the printing layout image information memory area 80*a*.

According to the example shown in FIGS. 7A and 7B, respective pieces of the (6 n+1)th line data (n is 0 or a larger integer) are removed. However, any line data other than these pieces of data may be removed as long as one line is removed for every six lines. In any cases, the compressive conversion process in this example equally thins out the character data in the overall character printing area shown in FIG. 6 as an example.

Figure 5:
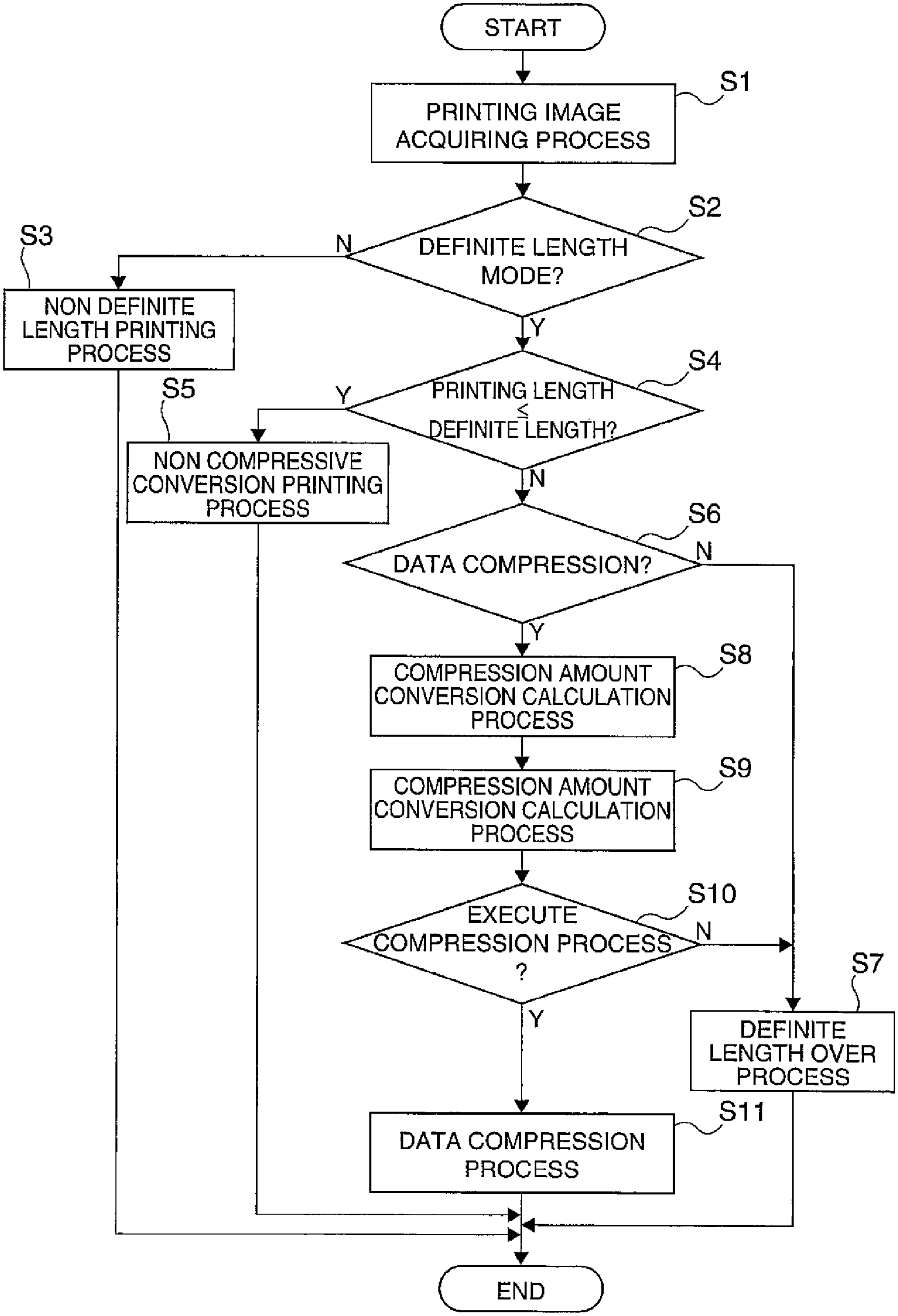
FIG. 5 is a flowchart showing operation performed in a printing process.

While the compression process in the case shown in FIG. 6 has been discussed herein as an example, the rate of removal of the line data in step S9 is generally determined based on the compression amount calculated in step S8 shown in FIG. 5. More specifically, while one line is removed for every six lines so that the number of line data to be removed occupies ⅙ of the total number of the line data for the necessity of reduction equivalent to the compression amount as ⅙ of the overall data in the example in FIG. 6, the optimum method of compressive conversion process is determined in step S9 according to the compression amount calculated in step S8 when the compression amount calculated in step 8 is different from that in this example. According to the example in this embodiment, the method of the compressive conversion process is uniformly determined in step S9 according to the calculation results obtained in step S8.

Since the overall character printing area is thinned out at equal intervals in this embodiment, compression can be executed while maintaining identifiability of all the characters. In addition, the compressive conversion process which is standardized is easy and capable of carrying out compressive conversion for all types of characters. Thus, characters such as external fonts based on external data given from the portable memory device 61 can be similarly compressed. Furthermore, the compression amount can be determined such that excessive compression is not included.

FIGS. 8A to 8H are views for explaining an example of display operation and printing result of the tape printer 10 according to this embodiment.

Figure 8:
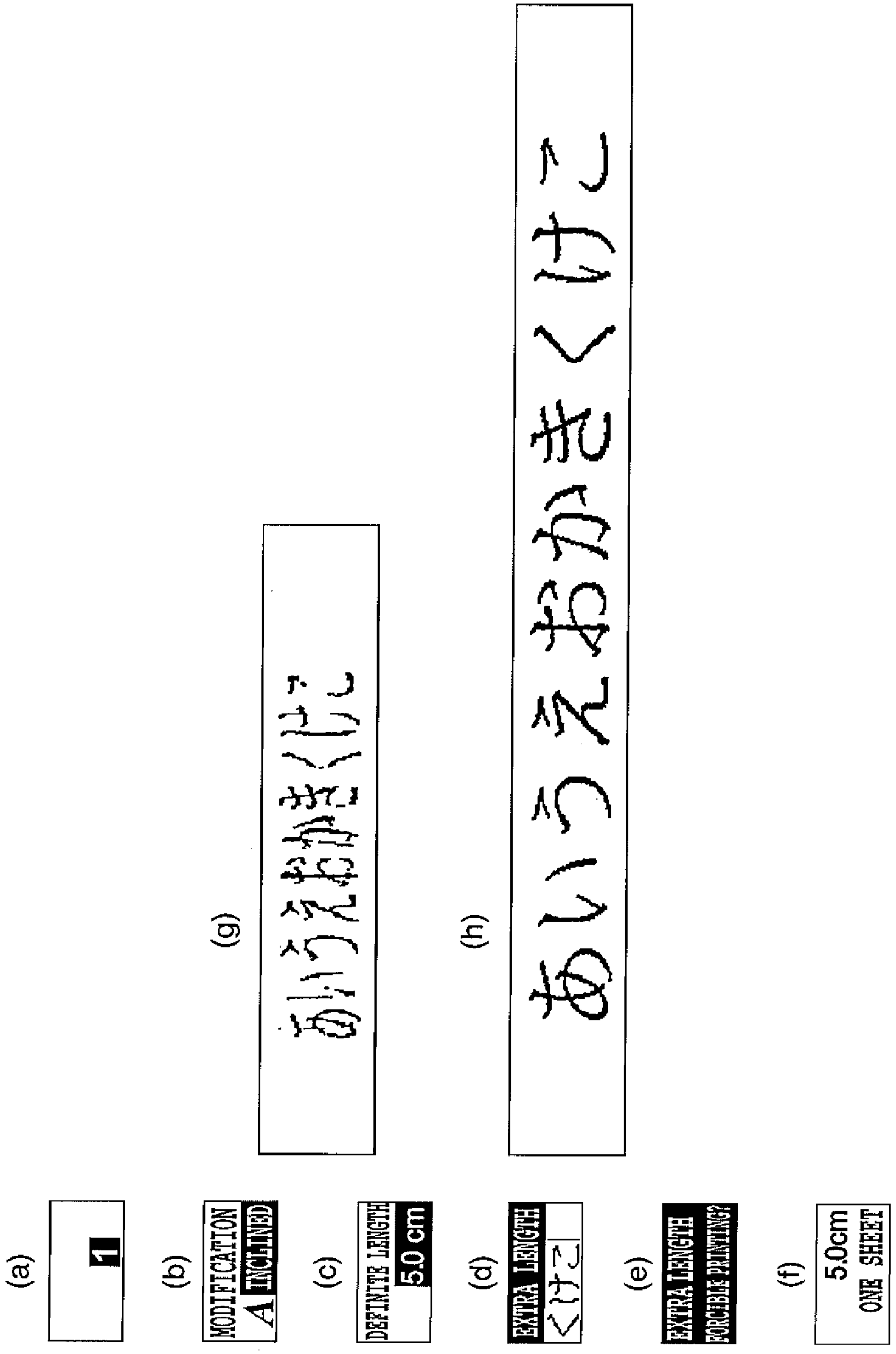
FIGS. 8A through 8H are views for explaining operation performed by the tape printer.

When the tape printer 10 is turned on by the user, an indication of the initial condition shown in FIG. 8A is displayed first on the display screen 36 shown in FIG. 1. Then, a selection menu for setting printing is displayed by suitable operation of the function keys 32 or the like or after elapse of a certain period of time.

In this case, an indication for selecting modified character shown in FIG. 8B is initially displayed on the display screen 36 by operation of the function keys 32 or the like. The user can select a suitable modification pattern from the "modification menu options" by operating the function keys 32 or the like.

The "modification menu options" include "normal" (no change), "white" (white character), "emphasis" (emphasized character), "inclined" (inclined character), "horizontal strips" (character with horizontal strips), "vertical strips" (character with vertical strips), and "cross strips" (character with horizontal and vertical strips), and other modifications.

Then, an indication shown in FIG. 8C for setting the definite length mode is displayed by the operation of the user through the function keys 32 or the like. When the user designates the definite length by operation of the function keys 32 or the like as the mode setting unit, the control processing unit 77 as the mode setting unit receives the setting of the definite length mode. In this example, allocation of the definite length of 50 mm is selected. Thus, the definite length DL is set at 50 mm as illustrated in FIG. 6. The information on the established definite length mode (in this case, information about the definite length DL of 50 mm) is retained in the definite length printing information memory area 80*b* shown in FIG. 4.

After setting of the respective modes is completed, the user inputs appropriate characters to be printed as illustrated in FIG. 8D through an operation on the keyboard 33. When it is judged that the printing length PL exceeds the definite length DL, that is, the length of the input of the characters exceeds the definite length in step S4 shown in FIG. 5, an indication "extra length" is shown as illustrated in FIG. 8D.

When the indication "extra length" is shown at the time of operation for printing by the user after completion of the inputting operation, an indication shown in FIG. 8E is displayed. More specifically, a display is shown asking whether the definite length mode is to be performed or not by forcible printing which thins out the characters by the compressive conversion process discussed above. When the user determines execution of the forcible printing by operating the function keys 32, an indication shown in FIG. 8F is displayed. In this case, the processes in step S8 and the following steps are carried out by the control processing unit 77 to perform the compressive conversion process.

An example shown in FIG. 8G illustrates a printed matter corresponding to the corrected printing image based on the corrected printing data created by the compressive conversion process. It is possible that whether the forcible printing is to be performed or not is determined after a printing image of thinned characters by the compressive conversion process is displayed on the display screen 36 prior to the forcible printing.

When the ordinary printing process is executed by canceling the definite length mode and thus omitting the compressive conversion process, a printed matter shown in FIG. 8H is obtained, for example.

While a specific example has been described, it is not intended that this invention is limited to this example but may be practiced otherwise. For example, while the tape printer which uses the tape-shaped printing materials has been discussed as the printer of the invention, the invention is applicable to other types of printer which perform printing on label-shaped printing materials or on ordinary printing sheets. When the tape-shaped materials are used, the compression direction in the compressive conversion process according to this embodiment corresponds to the longitudinal direction of the tape-shaped materials.

Second Embodiment

While the compressive conversion process according to the first embodiment thins out character data in the overall character printing area at equal intervals, other types of compressive conversion process may be carried out. A compressive conversion process according to a second embodiment establishes a specific part in a character printing area, and thins out character data in this specific part.

Figure 9:
FIGS. 9A to 9D are views for explaining a compressive conversion process according to a second embodiment.

FIGS. 9A to 9D are views for explaining the compressive conversion process which thins out character data corresponding to the specific part of the character printing area. FIG. 9A shows an example of a printed matter obtained by standard printing of an image corresponding to character data without carrying out the compressive conversion process. On the other hand, printed matters shown in FIGS. 9B to 9D are examples obtained by executing the compressive conversion process in this embodiment.

According to this embodiment, the compressive conversion process is performed only for a specific part set beforehand in the character printing area. More specifically, the character printing area shown in FIG. 9A is divided into three specific parts of head part HP, center part CP, and tail part TP. The compressive conversion is performed only for the head part HP in the example of FIG. 9B, for the center part CP in the example of FIG. 9C, and for the tail part TP in the example of FIG. 9D.

For execution of the compressive conversion process, a specific part mode is provided for specifying one of the parts HP, CP and TP in the character printing area as the specific part for which the compressive conversion process is performed to create corrected printing data. More specifically, for execution of the compressive conversion process, such a mode is provided which selects any one of the parts "head", "center" and "tail" of the character string as the specific part to be compressed by the operation of the user through the function keys 32. In this case, information on the specific part mode selected by operation of the function keys 32 is appropriately stored in a memory area of the RAM 73*b*. The control process unit 77 selects the method of compressive conversion process by reading the information on the specific part mode in step S9 shown in FIG. 5. More specifically, the part for which the compressive conversion process is performed is specified from the parts HP, CP and TP based on the information from the RAM 73*b* in step S9. Then, the compressive conversion process in accordance with the compression amount calculated in step S8 in FIG. 5 is selected for the corresponding specific part. The specific part mode is set at any time before execution of the process in step S9 shown in FIG. 5. Thus, for example, the specific part mode may be performed before the input operation of the characters as in the setting of the various modes shown in FIGS. 8B and 8C as an example in the first embodiment. Alternatively, for example, the specific part mode may be selected at the time of execution of the forcible printing shown in FIG. 8E as an example.

Thus, such a compressive conversion process is performed which partially compresses only the specific part and maintains the ordinary printing condition in other parts as in the cases shown in FIGS. 9B to 9D by the processes discussed above.

While a specific example has been described, it is not intended that this invention is limited to this example but may be practiced otherwise. For example, while the specific part to be compressed is the "head part", "center part", or "tail part" of the character string in this example, the specific part may be a specific character of the character string as the specific part, for example. In this case, the specific part to be compressed may be only numerals, only words and phrases such as hiragana letters, or on the contrary only words other than specific letters such as Chinese characters in the character string, for example. In this embodiment, therefore, only a desired part can be compressed according to the demand of the user.

Third Embodiment

A compressive conversion process according to a third embodiment thins out character data in accordance with the characteristics of the respective characters.

Figure 10:
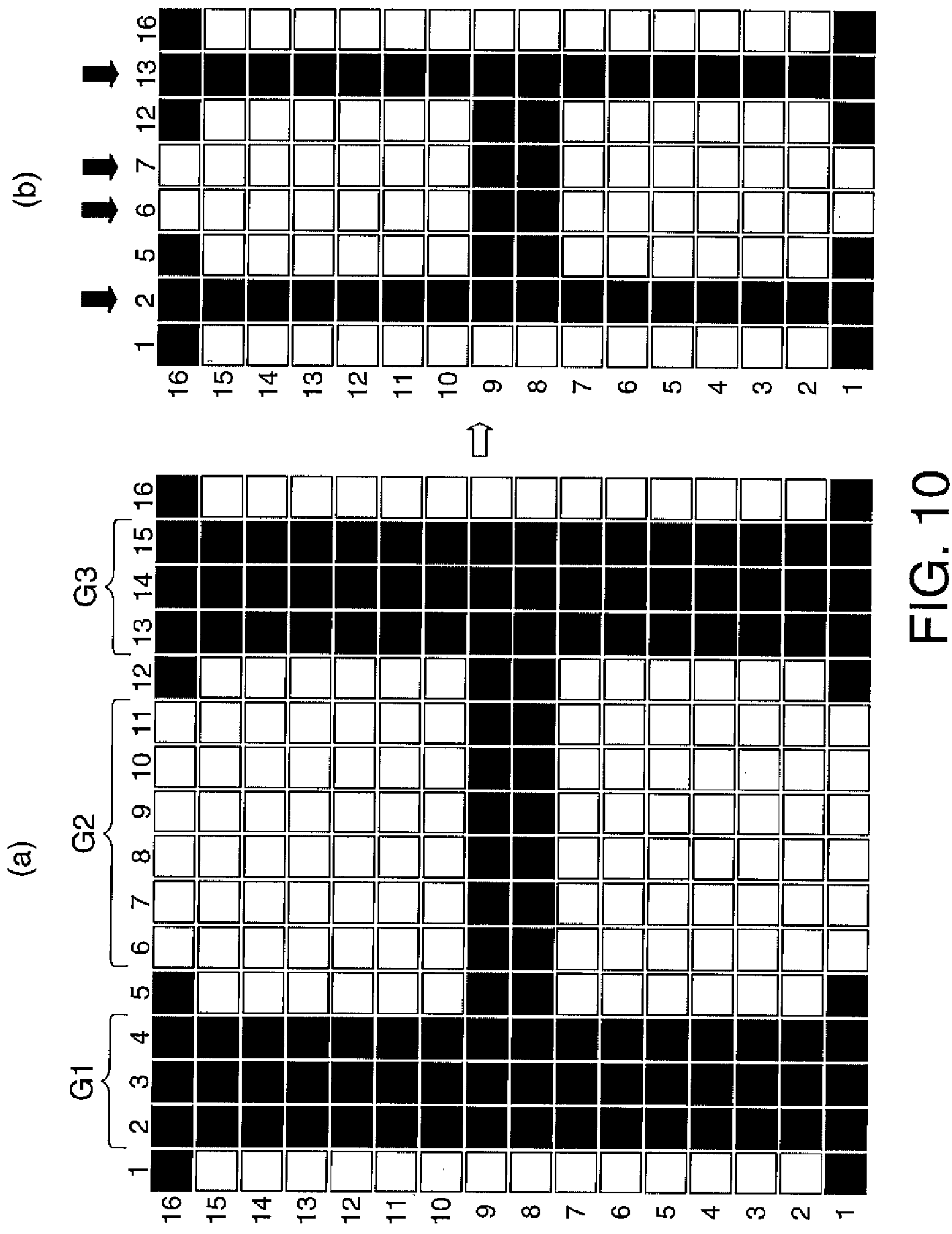
FIGS. 10A and 10B are views for explaining a compressive conversion process according to a third embodiment.

FIGS. 10A and 10B are views for explaining an example of the compressive conversion process according to this embodiment. FIG. 10A shows an example of a character before the compressive conversion process. In this example, a character "H" having 16×16 dots is used for simplifying explanation. In this case, the respective character data arranged in the vertical direction are divided into plural pieces of belt-shaped line data each of which has one-dot width. In the respective divisions of line data, the adjoining second through fourth line data have all black dots and thus have identical data. Similarly, the adjoining sixth through eleventh line data, and the adjoining thirteenth through fifteenth line data have continuous identical data. In this embodiment, these data have priority in thinning out since the effect of thinning out of these data is smaller for recognition of the character.

For example, assuming that the second through fourth line data, the sixth through eleventh line data, and the thirteenth through fifteenth line data in FIG. 10A are G1, G2 and G3, respectively, each of the line data G0, G2 and G3 may be partially removed to convert the character shown in FIG. 10A into the character shown in FIG. 10B. More specifically, according to the character shown in FIG. 10B, each of the line data G1 and G3 in FIG. 10A is compressed to line data having one-dot width, and the line data G2 is compressed to line data having two-dot width. Thus, the character "H" having 16-dot width is compressed to the character "H" having 8-dot width by the processes herein. In this case, the data having low possibility of losing the meaning of the character after thinning out has priority in thinning out. Accordingly, compression can be efficiently carried out while maintaining the meaning of information as the letters or the like of the respective characters.

The compressive conversion according to this embodiment may execute conversion according to the respective characteristics of the characters, or may uniformly carry out conversion by setting a fixed thinning-out rate in advance at the portions of continuous identical data in the adjoining pieces of line data. In case of the fixed thinning-out rate established in advance, compressive conversion can be executed for any types of characters. For example, compressive conversion can be performed for characters such as external fonts based on outside data supplied from the portable memory device 61.

While a specific example has been described, it is not intended that this invention is limited to this example but may be practiced otherwise. For example, the above processes for thinning out character data according to the specific part of the character printing area and to the characteristics of characters may be combined as the compressive conversion process for fitting the character printing area to the definite length. In this case, the combined process is disposed in the selection process of compressive conversion in step S9 shown in FIG. 4 such that the optimum process is automatically selected. Alternatively, several selection patterns may be provided such that the user can select the optimum mode.

What is claimed is:

1. A document processor, comprising:

a data memory unit which retains character data concerning a character to be printed on a printing material;

a mode setting device which sets a definite length mode for specifying a definite length printing area where the character is printed on the printing material;

an area judging unit which judges whether a character printing area necessary for standard printing of an image corresponding to the character data on the printing material exceeds the definite length printing area; and a printing data processing unit which creates corrected image data corresponding to a corrected printing image produced by thinning out the image corresponding to the character data in a printing direction to perform a compressive conversion process for fitting the character printing area to the definite length printing area when the area judging unit judges that the character printing area exceeds the definite length printing area;

wherein the printing data processing unit thins out the character data at equal intervals to perform the compressive conversion process.

2. The document processor according to claim 1, wherein the data memory unit retains the character data as information in such a form as can be represented as bit map data.

3. A tape printer, comprising:

the document processor according to claim 1; and a printing device that prints the corrected printing image on the printing material based on the corrected image data created by the printing data processing unit, wherein the printing device performs printing on a tape-shaped material as the printing material.

4. The tape printer according to claim 3, wherein the printing data processing unit performs compressive conversion process in longitudinal direction of the tape-shaped material.

5. A printer comprising:

the document processor according to claim 1; and a printing device that prints the corrected printing image on the printing material based on the corrected image data created by the printing data processing unit.

6. A document processor comprising:

a data memory unit that retains character data concerning a character to be printed on a printing material;

a mode setting device that sets a definite length mode for specifying a definite length printing area where the character is printed on the printing material;

an area judging unit that judges whether a character printing area necessary for standard printing of an image corresponding to the character data on the printing material exceeds the definite length printing area; and a printing data processing unit that creates corrected image data corresponding to a corrected printing image produced by thinning out the image corresponding to the character data in a printing direction to perform a compressive conversion process for fitting the character printing area to the definite length printing area when the area judging unit judges that the character printing area exceeds the definite length printing area, wherein:

the mode setting device sets a specific part mode which specifies a specific part of the character printing area to create the corrected image data; and the printing data processing unit thins out the character data corresponding to the specific part specified by the specific part mode to perform the compressive conversion process.

7. A printer comprising:

the document processor according to claim 6; and a printing device that prints the corrected printing image on the printing material based on the corrected image data created by the printing data processing unit.

8. A document processor comprising:

a data memory unit that retains character data concerning a character to be printed on a printing material;

a mode setting device that sets a definite length mode for specifying a definite length printing area where the character is printed on the printing material;

an area judging unit that judges whether a character printing area necessary for standard printing of an image corresponding to the character data on the printing material exceeds the definite length printing area; and a printing data processing unit that creates corrected image data corresponding to a corrected printing image produced by thinning out the image corresponding to the character data in a printing direction to perform a compressive conversion process for fitting the character printing area to the definite length printing area when the area judging unit judges that the character printing area exceeds the definite length printing area, wherein the data memory unit retains the character data as information in such a form as can be represented as bit map data, and the printing data processing unit divides the character data into plural pieces of belt-shaped line data each of which has one-dot width in the compressive conversion process, and gives priority in thinning out to adjoining pieces of line data having identical continuous data to perform the compressive conversion process.

9. A printer comprising:

the document processor according to claim 8; and a printing device that prints the corrected printing image on the printing material based on the corrected image data created by the printing data processing unit.

10. A document processing method comprising:

storing character data concerning a character to be printed on a printing material;

specifying a definite length printing area where the character is printed on the printing material;

judging whether a character printing area necessary for standard printing of an image corresponding to the character data on the printing material exceeds the definite length printing area; and creating corrected image data corresponding to a corrected printing image produced by thinning out the character data at equal intervals in a printing direction to perform a compressive conversion process for fitting the character printing area to the definite length printing area when the character printing area is judged to exceed the definite length printing area.

11. A document processing method comprising:

storing character data concerning a character to be printed on a printing material;

specifying a definite length printing area where the character is printed on the printing material;

judging whether a character printing area necessary for standard printing of an image corresponding to the character data on the printing material exceeds the definite length printing area; and creating corrected image data corresponding to a corrected printing image produced by thinning out the image corresponding to the character data in a printing direction to perform a compressive conversion process for fitting the character printing area to the definite length printing area when the character printing area is judged to exceed the definite length printing area, wherein a specific part of the character printing area is specified to create the corrected image data; and the character data is thinned out corresponding to the specific part to perform the compressive conversion process.

12. A document processing method comprising:

storing character data concerning a character to be printed on a printing material;

specifying a definite length printing area where the character is printed on the printing material;

judging whether a character printing area necessary for standard printing of an image corresponding to the character data on the printing material exceeds the definite length printing area; and creating corrected image data corresponding to a corrected printing image produced by thinning out the image corresponding to the character data in a printing direction to perform a compressive conversion process for fitting the character printing area to the definite length printing area when the character printing area is judged to exceed the definite length printing area, wherein the character data is stored as information in such a form as can be represented as bit map data, and the character data is divided into plural pieces of belt-shaped line data each of which has one-dot width in the compressive conversion process, and priority is given in thinning out to adjoining pieces of line data having identical continuous data to perform the compressive conversion process.

* * * * *